(12) United States Patent
Rosenberg (10) Patent No.: US 7,435,105 B2
(45) Date of Patent: Oct. 14, 2008

(54) ELECTRICAL CONNECTOR FOR USE IN AN OPTICAL TRANSCEIVER MODULE

(75) Inventor: Paul K. Rosenberg, Sunnyvale, CA (US)

(73) Assignee: Finisar Corporation, Sunnyvale, CA (US)

(*) Notice: Subject to any disclaimer, the term of this patent is extended or adjusted under 35 U.S.C. 154(b) by 20 days.

(21) Appl. No.: 11/091,686

(22) Filed: Mar. 28, 2005

(65) Prior Publication Data

US 2005/0232555 A1    Oct. 20, 2005

Related U.S. Application Data

(60) Provisional application No. 60/557,203, filed on Mar. 29, 2004.

(51) Int. Cl.
*H01R 9/00* (2006.01)

(52) U.S. Cl. ...................... 439/76.1; 439/862

(58) Field of Classification Search ............... 439/862, 439/66, 79, 80; 385/88, 89, 92
See application file for complete search history.

(56) References Cited

U.S. PATENT DOCUMENTS

| | | | | |
|---|---|---|---|---|
| 3,550,062 A | * | 12/1970 | Drenten et al. ............ | 439/64 |
| 4,509,811 A | * | 4/1985 | Amano et al. ............. | 439/77 |
| 4,664,458 A | * | 5/1987 | Worth ..................... | 439/82 |
| 5,295,214 A | * | 3/1994 | Card et al. ............... | 385/92 |
| 5,378,160 A | * | 1/1995 | Yumibe et al. ............ | 439/66 |
| 5,513,073 A | * | 4/1996 | Block et al. .............. | 361/719 |
| 5,951,303 A | * | 9/1999 | Wilmsmann nee Sudmoller ........ | 439/66 |
| 6,604,950 B2 | * | 8/2003 | Maldonado et al. ........ | 439/66 |
| 6,617,518 B2 | * | 9/2003 | Ames et al. ............... | 174/254 |
| 6,840,686 B2 | * | 1/2005 | Jiang et al. ............... | 385/92 |
| 6,873,800 B1 | * | 3/2005 | Wei et al. ................. | 398/138 |
| 7,097,468 B2 | * | 8/2006 | Ice ......................... | 439/79 |

* cited by examiner

*Primary Examiner*—Neil Abrams
(74) *Attorney, Agent, or Firm*—Workman Nydegger (57) ABSTRACT

A connector for interconnecting electronic components within a device, such as an optical transceiver module, is disclosed. In one embodiment the connector utilizes compressive engagement to electrically connect an optical subassembly to a printed circuit board within the optical transceiver. In one embodiment, the electrical connector includes a body that mechanically mounts on the printed circuit board. The body defines a plurality of slots, each having a first portion of a conductive finger positioned therein. The first portion of each finger is arcuately shaped and extends from the slot. The connector is positioned such that each finger compressively engages and electrically connects with a corresponding contact pad on the optical subassembly when the optical transceiver is assembled. A second portion of each finger extends from a face of the connector body and electrically connects with corresponding contact pads on the printed circuit board, electrically connecting it with the optical subassembly.

11 Claims, 7 Drawing Sheets

ELECTRICAL CONNECTOR FOR USE IN AN OPTICAL TRANSCEIVER MODULE

RELATED APPLICATIONS

This application claims the benefit of U.S. Provisional Patent Application Ser. No. 60/557,203, filed Mar. 29, 2004, entitled "Electrical Connector for Use in an Optical Transceiver Module," which is incorporated herein by reference in its entirety.

BACKGROUND OF THE INVENTION

1. The Field of the Invention

The present invention generally relates to optical transceiver modules. More particularly, the present invention relates to an electrical connector device for enabling the interconnection of various components within an optical transceiver module or similar optical device.

2. The Related Technology

Fiber optic technology is increasingly employed as a method by which information can be reliably transmitted via a communications network. Networks employing fiber optic technology are known as optical communications networks, and are marked by high bandwidth and reliable, high-speed data transmission.

Optical communications networks employ optical transceivers in transmitting information via the network from a transmission node to a reception node. An optical transceiver at the transmission node receives an electrical signal from a network device, such as a computer, and converts the electrical signal via a laser to an optical signal. The optical signal can then be emitted by the transceiver and transmitted in an optical fiber via the optical network, such as a LAN backbone, for instance. The optical signal is then received by a reception node of the network. Once received by the reception node, the optical signal is fed to another optical transceiver for conversion via a photodetector into electrical signals. The electrical signals are then forwarded to a host device, such as a computer, for processing. The optical transceivers described above have both signal transmission and reception capabilities; thus, the transmitter portion of the transceiver can convert an incoming electrical signal into an optical signal while the receiver portion of the transceiver simultaneously converts an incoming optical signal into an electrical signal.

In a typical implementation, the laser of the transceiver is positioned in a transmitter optical subassembly ("TOSA"), while the photodetector is located in a receiver optical subassembly ("ROSA"). Additionally, a printed circuit board ("PCB") is also positioned within the transceiver. Each of the PCB, TOSA, and ROSA can include additional components that are typically included in a transceiver. Among these are a controller, which governs general operation of the transceiver, a laser driver for controlling operation of the laser in the transmitter portion, and a post-amplifier for controlling the photodetector that converts incoming optical signals into electrical signals in the receiver portion.

It is necessary to electrically interconnect the components of the TOSA and ROSA with those components located on the PCB in order to enable transceiver functionality. As such, a plurality of conductive signal paths must be established between conductive contact points located on each of the TOSA and ROSA and conductive contact points on the PCB. Because these contact points are generally positioned along non-parallel planes, the interconnecting signal paths must often be physically defined through three dimensions to enable extension between the respective contact points. Examples of such interconnection schemes include flex circuits and lead frames.

Though flex circuits and lead frames are generally acceptable for electrically connecting the TOSA and ROSA with the PCB, they nonetheless suffer from a number of challenges. Among these is the relative complexity involved in installing such components within the transceiver. For instance, in the case of flex circuits, several steps must be taken to interconnect them with the TOSA, ROSA, and PCB, including pre-soldering preparation, soldering the flex circuit to the contact points of the TOSA and ROSA, strain relieving the solder joints with an epoxy, bending the flex circuit into alignment with the contact points of the PCB, then soldering the flex circuit to the PCB contact points. In typical transceivers, 10 or more contact points can be located at either end of the flex circuit necessitating at least 20 soldering operations to fully connect the TOSA and ROSA with the PCB. As mentioned, this can involve relatively large quantities of material, time, and expense.

Soldered flex circuits, lead frames, and similar electrical connection schemes suffer from another draw back: component re-work and replacement is made more difficult when the aforementioned transceiver components are electrically connected using such connection schemes. For instance, should replacement of the TOSA become necessary, it is first required, in the case of a flex circuit, to remove the adhesive used to stress-relieve the electrical connections made between the TOSA, the PCB, and the flex circuit. De-soldering of the flex circuit from the TOSA then must be performed, before removal of the TOSA from the transceiver module is possible. The electrical contact points of both the flex circuit and the TOSA must then be subjected to a cleaning procedure before re-soldering and adhesive application is performed to reestablish the electrical connection. Again, this amounts to added time and expense for any re-work, repair, or replacement procedure for the aforementioned transceiver components.

In addition to the costs associated with the re-work, repair, and replacement procedures described above, it is recognized that some devices and components will be inadvertently damaged during such procedures. If the damage is recognized, further repair or scrapping of the affected components may be necessary. This represents additional cost associated with these procedures. Further, it is possible that damage done during these procedures will go undetected, which undesirably leads to subsequent component or device failure during its operational phase. In light of these consequences that result from the challenges inherent in the known electrical connection schemes described above, many companies engaged in the relevant industry refuse to repair of refurbish components or devices having such connectors.

In light of the above discussion, a need exists for a means by which components within an optical transceiver module or other device can be electrically interconnected. Such a solution should avoid the problems mentioned above, including the substantial time and expense involved in soldering and performing other related steps. Any proposed solution should also facilitate relatively quick re-work procedures should repair or replacement of transceiver components, such as the TOSA or ROSA, become necessary. Finally, it would be advantageous for any proposed solution to facilitate ready assembly of transceiver components in a minimum amount of time.

BRIEF SUMMARY

A connector for interconnecting electronic components within a device, such as an optical transceiver module, is disclosed. In one embodiment the connector utilizes compressive engagement to electrically connect an optical subassembly to a printed circuit board within the optical transceiver. In one embodiment, the electrical connector includes a body that mechanically mounts on the printed circuit board. The body defines a plurality of slots, each having a first portion of a conductive finger positioned therein. The first portion of each finger is arcuately shaped and extends from the slot. The connector is positioned such that each finger compressively engages and electrically connects with a corresponding contact pad on the optical subassembly when the optical transceiver is assembled. A second portion of each finger extends from a face of the connector body and electrically connects with corresponding contact pads on the printed circuit board, electrically connecting it with the optical subassembly.

In another embodiment an optical transceiver module is disclosed, including a transceiver housing that contains various electronic components, a printed circuit board, and an electrical connector that electrically connects the electronic components to the printed circuit board. The electrical connector includes a thermoplastic body, and a plurality of conductive fingers attached to the body. Each conductive finger has a first portion extending from a first face of the body to engage a conductive surface of one of the electronic components. Each conductive finger further includes a second portion positioned on a second face of the body to engage a conductive surface of the printed circuit board.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1-9 depict various features of embodiments of the present invention, which is generally directed to an electrical connector for use within optical transceiver modules and other electrical devices. In particular, an electrical connector is disclosed that enables a quick and secure electrical connection to be established between one or more optical subassemblies and a printed circuit board within the transceiver. The electrical connection via the electrical connector is established while minimizing the use of adhesive means, including solder, thereby substantially simplifying the transceiver assembly process. Additionally, by minimizing the use of adhesive and other related materials, the electrical connector saves time, waste, and expense when repair or changeout of selected transceiver components may be required during reworking procedures.

Figure 1:
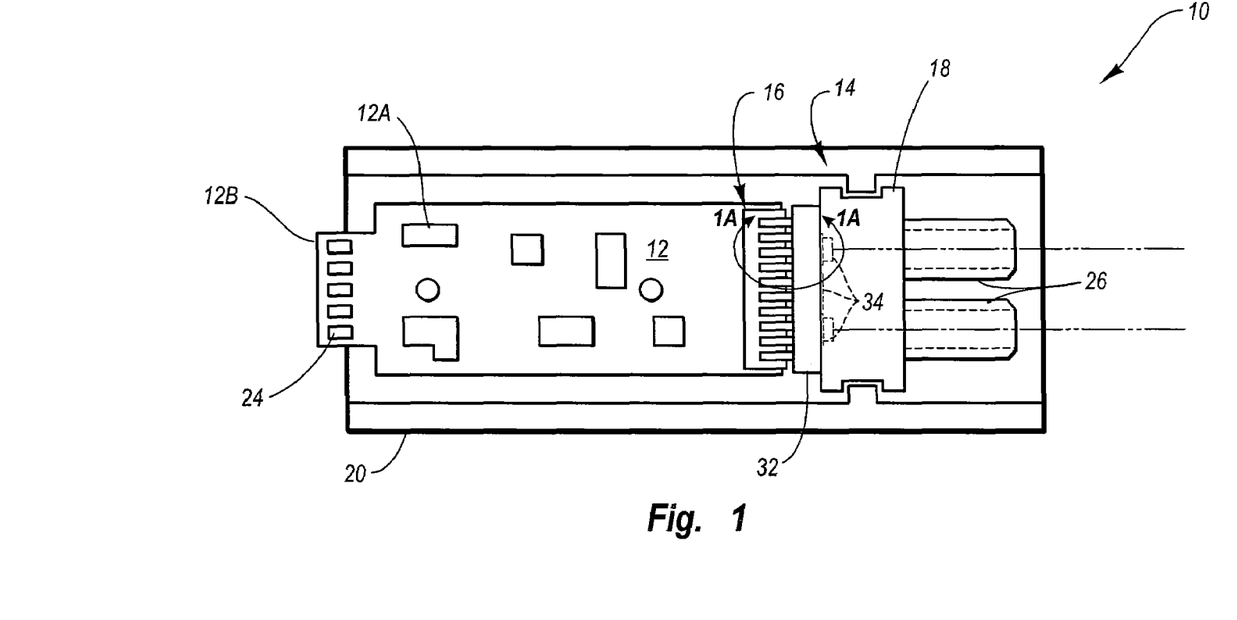
FIG. 1 is a bottom view of an optical transceiver module, incorporating an electrical connector according to one embodiment of the present invention.
Figure 1A:
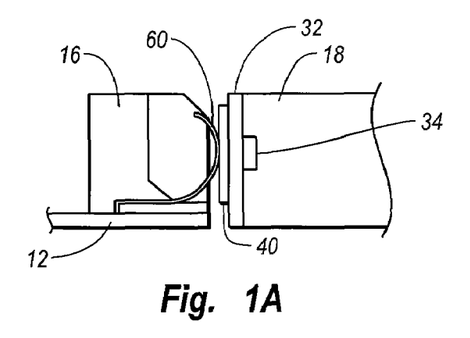
FIG. 1A is a close-up view of a portion of the FIG. 1 assembly.

Reference is first made to FIG. 1, which depicts one operating environment wherein embodiments of the present invention can be practiced. Note, however, that this embodiment is exemplary only. As such, it should be appreciated that the present invention can be practiced in a variety of environments and devices that differ from that depicted in FIG. 1 and accompanying figures. In particular, FIG. 1 shows an optical transceiver module ("transceiver"), generally depicted at 10. FIG. 1 affords a bottom view of the transceiver 10, which generally includes a transceiver printed circuit board ("TPCB") 12 and a transmitter/receiver optical subassembly ("TROSA") 14. The TROSA 14 in turn includes a TROSA substrate 32 having a plurality of optoelectronic components 34 positioned thereon, and a sleeve assembly 18 having sleeves 26. The aforementioned components are housed within a shell 20 and a closure 22 (see FIG. 7E) that together form a portion of the transceiver housing. Further details concerning each of these components, including their operable relationship once assembled into the transceiver 10, are discussed below.

The TPCB 12 and TROSA 14 are interconnected within the transceiver via an electrical connector, which is generally depicted at 16, and which is configured according to embodiments of the present invention to simplify assembly and disassembly of the transceiver 10. Further details regarding the connector 16 are given further below.

The TPCB 12 is positioned within the shell 20 of the transceiver 10 so as to support components that are necessary for transceiver operation. Comprising a suitable material typical of printed circuit boards, the TPCB 12 can include thereon various passive and other electrical and optical components 12A that provide functionality for the transceiver 10. The TPCB 12 further serves as a conduit through which electrical signals and data can be exchanged between components, such as the TROSA 14, and a host device (not shown) or other component. For instance, an electrical signal from the host device containing data to be transmitted by the transceiver 10 can be relayed from the host device to the transmitting components of the transceiver via the TPCB 12. To that end, the TPCB 12 can include on an end thereof an edge connector 12B for interfacing with the host device. The edge connector 12B can include electrical contacts 24 or similar means that electrically connect with similar contacts of the host device, or other intervening device, for transmitting electrical signals back and forth between the transceiver 10 and the host device. Of course, it is recognized that the specific details as to the host device, the edge connector, and their respective electrical contacts can vary from what is described herein.

The TROSA 14 is positioned within the shell 20 of the transceiver 10 adjacent the TPCB 12. The TROSA 14 includes both passive and active optical and electrical components that are involved in both the transmission and reception of optical signals by the transceiver. As mentioned, the TROSA 14 is electrically connected to the TPCB 12 via the connector 16 in a configuration to be detailed further below. Connection with the TPCB 12 via the connector 16 enables the TROSA 14 to relay data both to and from the host device during operation of the transceiver 10.

In the illustrated embodiment, the substrate 32 of the TROSA 14 comprises a singular structure within the transceiver 10, which substantially simplifies both the design and assembly of the transceiver. In other embodiments, however, the TROSA can be replaced by a transmitter optical subassembly ("TOSA") and a receiver optical subassembly ("ROSA") having separate substrates that are each discretely positioned within the shell 20. Additionally, in yet other embodiments the present connector can be utilized to interconnect various other components within a transceiver or other optical device. Further details regarding the TROSA and its use within the transceiver can be found in U.S. patent application Ser. No. 10/609,930, entitled "Optical Transceiver Having a Single Optical Subassembly," filed Jun. 30, 2003, which is incorporated herein by reference in its entirety.

As can be seen, the shell 20 is responsible for at least partially housing the various components referred to above. Composed of a suitable material such as metal or plastic, the shell 20 can define a shape similar to that shown in FIG. 1, or a distinct shape according to a particular design or anticipated application for the transceiver 10. Together with the closure 22 (discussed further below), the shell 20 forms a portion of the external housing of the transceiver 10.

Figure 2:
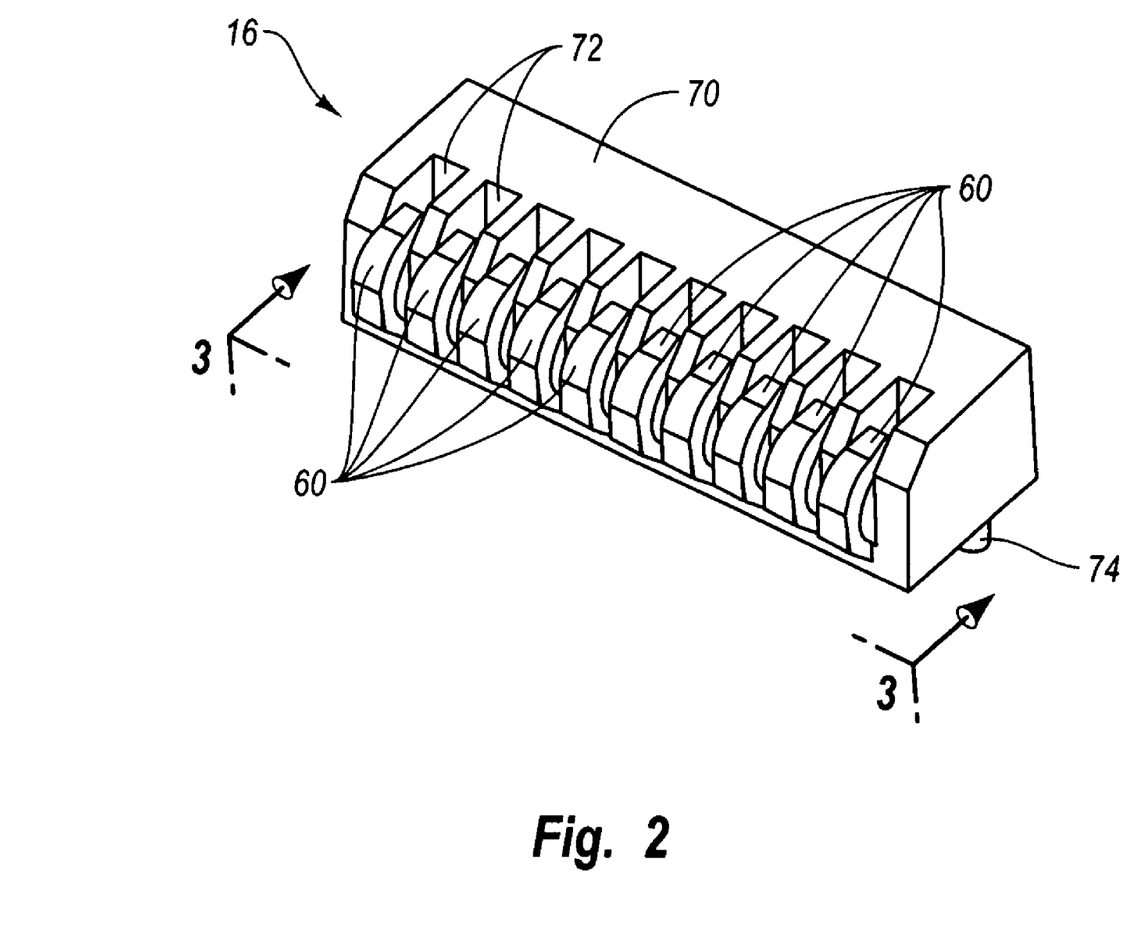
FIG. 2 is a perspective view of the electrical connector according to one embodiment.
Figure 3:
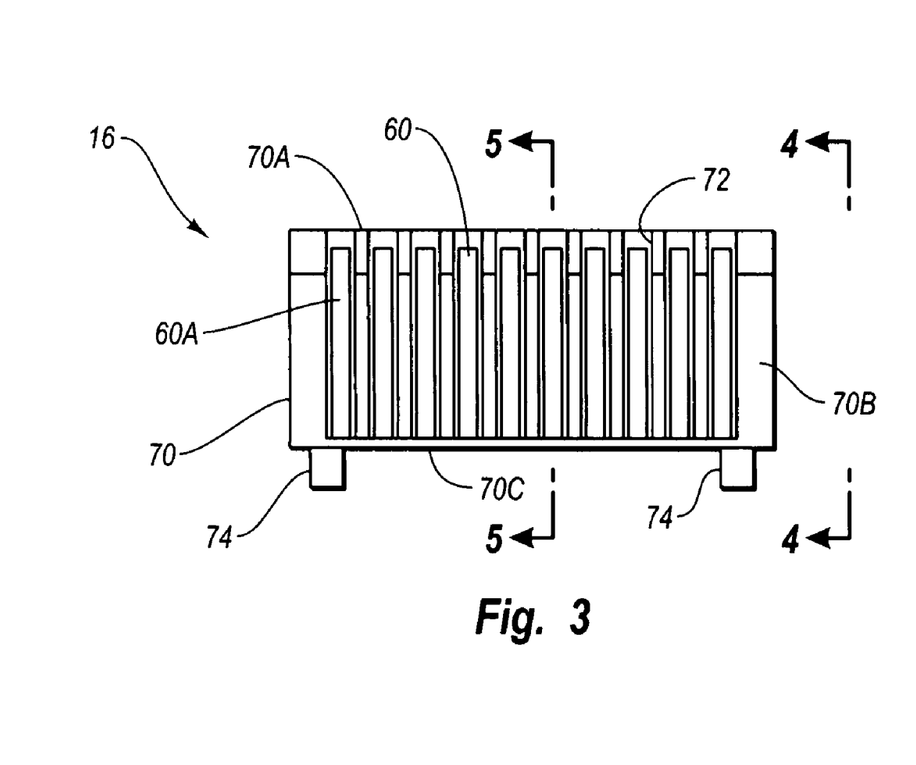
FIG. 3 is a front view of the electrical connector of FIG. 2, taken along the lines 3-3.
Figure 4:
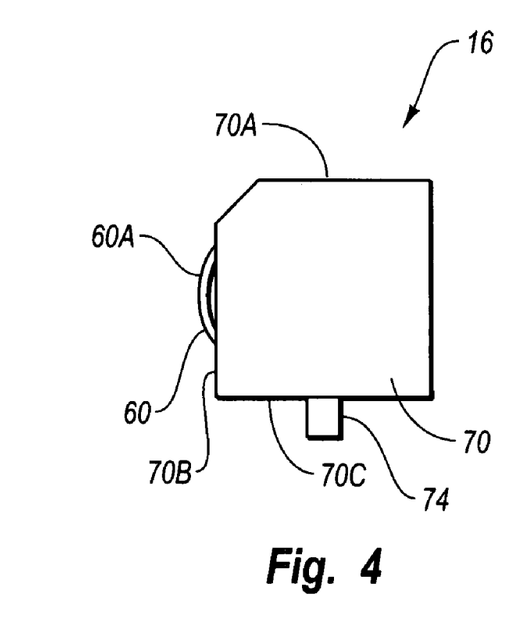
FIG. 4 is an end view of the electrical connector of FIG. 3, taken along the lines 4-4.

Collective reference is now made to FIGS. 2, 3, and 4 in describing various details regarding the connector 16. As shown, the connector 16 generally includes an elongate body 70 having a plurality of slots 72 defined on contiguous top and side faces 70A and 70B of the body. Two pins 74 extend from a bottom face 70C and are used for engagement with the TPCB 12, as will be described.

As shown, the body 70 has a generally rectangular, block-like shape suited to fit the form factor of the transceiver 10. The shape and configuration of the body 70 and slots 72, however, can be adapted in other embodiments for one of numerous different possible implementations as appreciated by those skilled in the art.

The connector 16 further includes a plurality of conductive ribbons, or fingers 60, each of which is positioned as to be partially contained within a corresponding one of the slots 72. In the illustrated embodiment, both the slots 72 and fingers 60 are uniformly sized and configured. In other embodiments, however, the slots, fingers, or both can vary in size, shape, position, etc. to accommodate varying electrical configurations. For example, in one embodiment each slot can include more than one conductive finger.

As seen in FIG. 4, the fingers 60 are each shaped to form an arcuate portion 60A a portion of which extends beyond the side face 70B of the body 70. As will be shown, the extended arcuate portion 60A of each finger 60 enables electrical connection to be made between the fingers and conductive contact pads located on the TROSA 14. Indeed, the rounded shape of the arcuate portion 60A of each finger 60 allows the finger to be resiliently displaced such that a compressive engagement is formed between the finger and a corresponding contact pad of the TROSA 14 when the two are brought into operable contact, as will be shown. This quality ensures an adequate electrical connection between the TROSA 14 and the connector 16. The arcuate portion 60A, though arcuately shaped here, can in other embodiments include one of a variety of shapes, including a combination of arcuate and flat segments.

Figure 5:
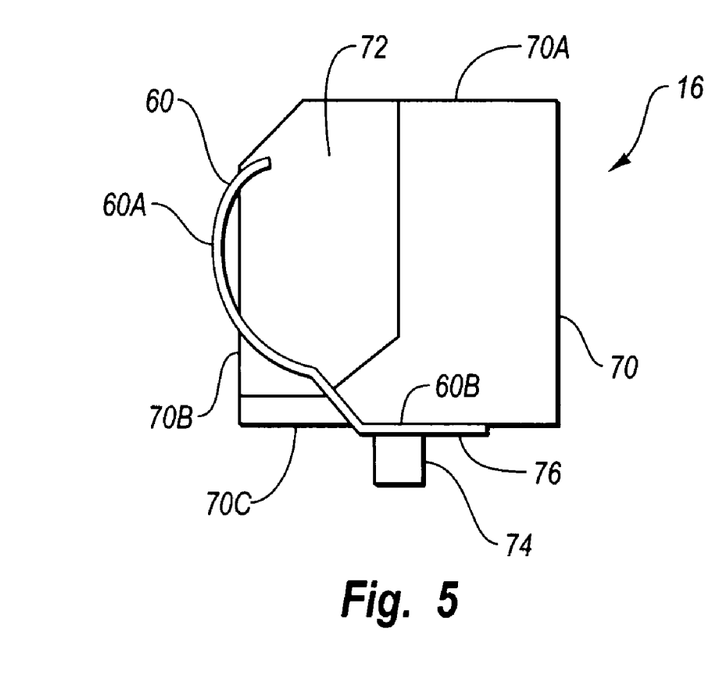
FIG. 5 is a cross sectional view of the electrical connector of FIG. 3, taken along the lines 5-5.

Reference is now made to FIG. 5, which shows a cross sectional view of the connector 16. Specifically, FIG. 5 affords a more detailed view of one of the plurality of fingers 60, which in this embodiment is representative of each finger. As shown, the finger 60 is partially located within the corresponding slot 72 and includes the arcuate portion 60A having a segment that protrudes beyond the side face 70B of the body 70. Each finger 60 further includes a contact portion 60B that is shaped to extend from the body 70 and form a contact pad 76 on the bottom face 70C of the body. As such, the contact portion 60B of each finger 60 enables the connector 16 to electrically connect with corresponding contact pads located on the TPCB 12, as will be shown.

Each finger 60 is secured to the body 70 in some suitable manner. In the present embodiment, a portion of each finger, such as the portion existing between the arcuate portion 60A and the contact portion 60B, can be molded into the connector body 70 during manufacture thereof. Other connection schemes are also possible, including snap-fit designs, mechanical fasteners, etc.

Figure 6:
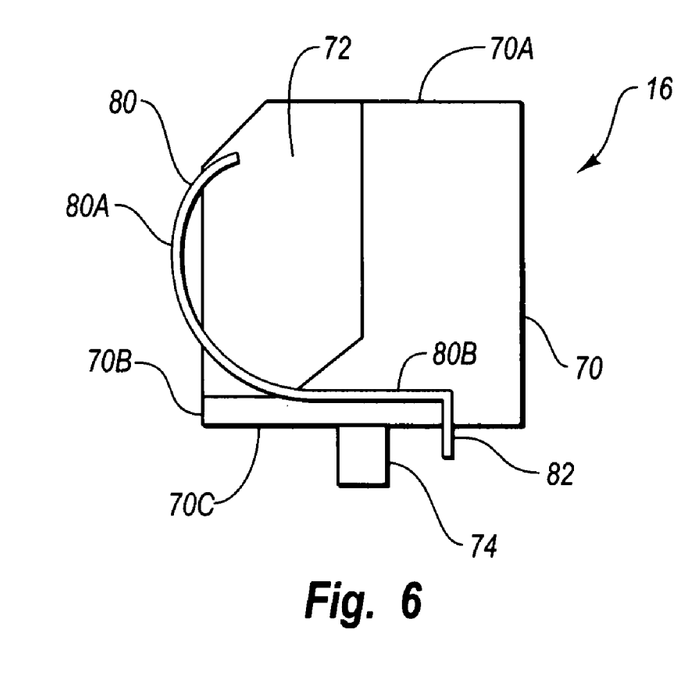
FIG. 6 is a cross sectional view of an electrical connector according to another embodiment.

Reference is now made to FIG. 6, showing various features of another embodiment of the present connector. In particular, a cross sectional view of the connector 16 is shown, similar to the depiction in FIG. 5. The connector 16 of FIG. 6 includes a plurality of conductive fingers 80, one of which is shown. Generally, embodiments of the present invention include the possibility that the conductive fingers are shaped to suit a particular use or application. FIG. 6 is an example of this, wherein the finger 80 includes an arcuate portion 80A that is shaped similarly to the arcuate portion 60A of FIG. 5, such that it protrudes beyond the side face 70B of the body 70. Each finger 80 further includes a contact portion 80B. The contact portion 80B is shaped so as to form a pin 82 that extends from the bottom face 70C of the body 70. As shown, the pin 82 of each finger 80 extends such that its longitudinal axis is substantially perpendicular to the plane defined by the bottom face 70C. As such, the contact pin 82 is suited for engaging a corresponding conductive through-hole (not shown) located on the TPCB 12, thereby enabling electrical connection between the connector 16 and the TPCB. In addition to those shown in FIGS. 5 and 6, it is appreciated that the connector 16 can include yet other finger configurations in addition to that shown herein. Additionally, a combination of finger types can be included in a single connector. Thus, it should be appreciated that FIGS. 5 and 6 are merely exemplary of the broader principles taught by embodiments of the present invention, and as such, these embodiments should not be considered limiting of the present invention in any way.

Figure 7A:
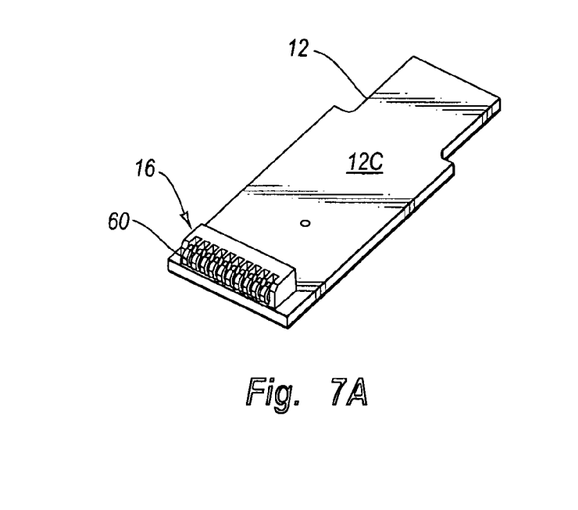
FIG. 7A is a perspective view showing the electrical connector of FIG. 3 attached to a printed circuit board according to one embodiment.

Reference is now made to FIGS. 7A-7E in discussing various details regarding the assembly of the transceiver 10 that incorporates an embodiment of the connector 16. In FIG. 7A, the TPCB 12 of the transceiver 10 is positioned such that a bottom face 12C thereof is shown. For purposes of clarity, the TPCB 12 is shown in FIG. 7A without optical or electrical components positioned thereon. The connector 16 is also shown, attached to the bottom face 12C of the TPCB 12.

Attachment of the connector 16 to the TPCB 12 can be accomplished in a variety of ways, but in one embodiment, the connector is first aligned with the TPCB such that the two pins 74 (FIG. 5) of the connector are aligned with corresponding holes (not shown) defined in the TPCB bottom face 12C. The pins 74 can be sized to be slightly larger than the holes in the TPCB 12. The connector 16 can then be pressed into place such that each pin forms an interference fit with the corresponding TPCB hole, thereby fixing the connector in place with the proper orientation. In this position, the contact pads 76 (FIG. 5) formed by each finger contact portion 60B (FIG. 5) are aligned and physically engaged with corresponding conductive contact pads (not shown) located on the TPCB bottom face 12C, thereby electrically connecting the TPCB 12 to the connector 16. In one embodiment, a conductive solder can be pre-placed on the contact pads of the TPCB 12, before positioning the connector 16 thereon. The solder can then be heated to secure the electrical connection between the contact pads of the connector 16 and the TPCB. Instead of the use of the pins 74, the connector 16 can be attached to the TPCB 12 by other suitable means, including solder, adhesive, screws, mechanical snaps, or the like.

Figure 7B:
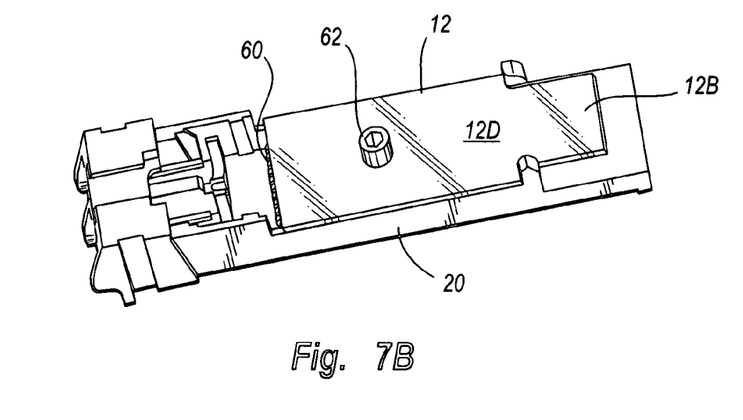
FIG. 7B is a perspective view showing one step in the assembly of an optical transceiver according to one embodiment.

In FIG. 7B, the TPCB 12 is shown placed in and attached to a portion of the shell 20 by way of an attachment screw 62. The edge connector 12B of the TPCB 12 is shown extending toward one end of the shell 20 such that it is able to connect with a host device (not shown). The TPCB 12 of FIG. 7B is shown positioned in the shell 20 such that a top face 12D thereof is shown facing up. In this TPCB configuration the connector 16, located on the bottom face 12C of the TPCB 12, is partially shown such that its conductive fingers 60 are seen. In alternative embodiments, the TPCB 12 is disposed within the shell 20 via a friction fit, snap fit, or other attachment scheme that obviates any need for mechanical fasteners.

Figure 7C:
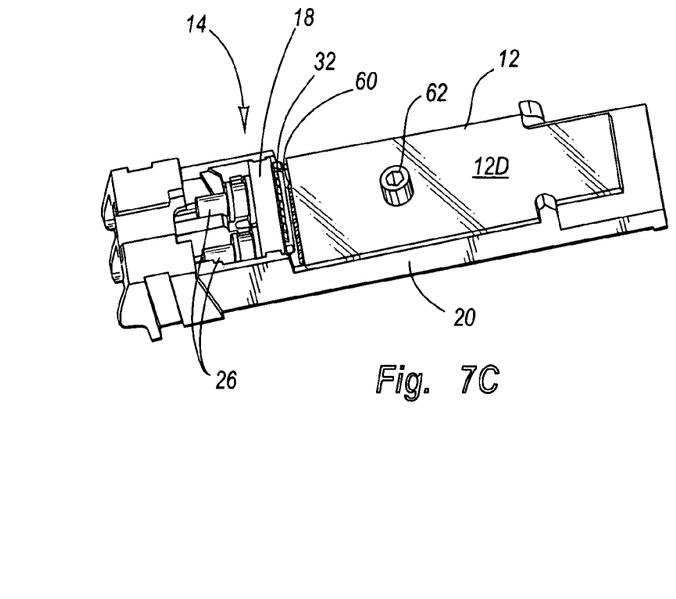
FIG. 7C is a perspective view showing another step in the assembly of the optical transceiver including placement of an optical subassembly.
Figure 7D:
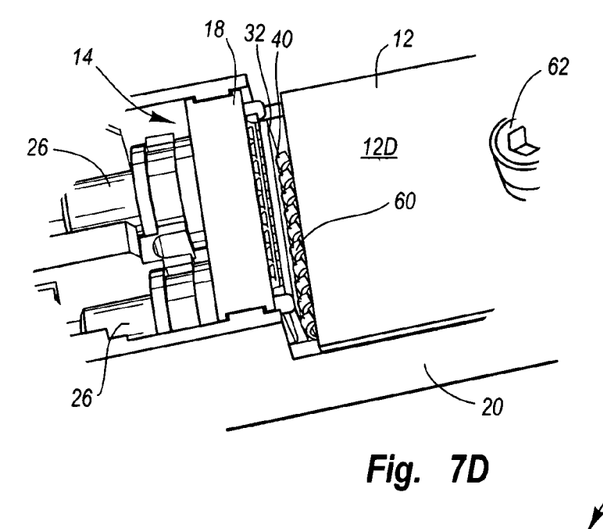
FIG. 7D is a close-up view of various optical transceiver components shown in FIG. 7C, including a view of the electrical connection between the optical subassembly and the electrical connector, according to one embodiment.

FIG. 7C shows the TROSA 14, including the substrate 32 and sleeve assembly 18, positioned in the shell 20. As seen, the shell 20 is cooperatively shaped to receive these and other components comprising the transceiver 10. In its seated position within the shell 20, the TROSA 14 is oriented such that a plurality of conductive contact pads 40 (FIG. 7D) that are positioned on the substrate 32 physically engage with the corresponding arcuate portions 60A (FIG. 5) of the connector fingers 60. Specifically, the engagement of TROSA contact pads 40 with the connector finger arcuate portions 60A is such that the fingers 60 are resiliently compressed a predetermined amount by engagement with the TROSA, thereby creating a compressive fit between the two and ensuring a secure connection. This connection is more clearly shown in FIG. 7D. This connection scheme establishes a plurality of suitable electrical paths from the TROSA 14 to the TPCB 12, and indirectly to the host device (not shown) that connects with the transceiver 10. This connection scheme also simplifies the manufacture of the transceiver 10, thereby reducing costs associated therewith.

Figure 7E:
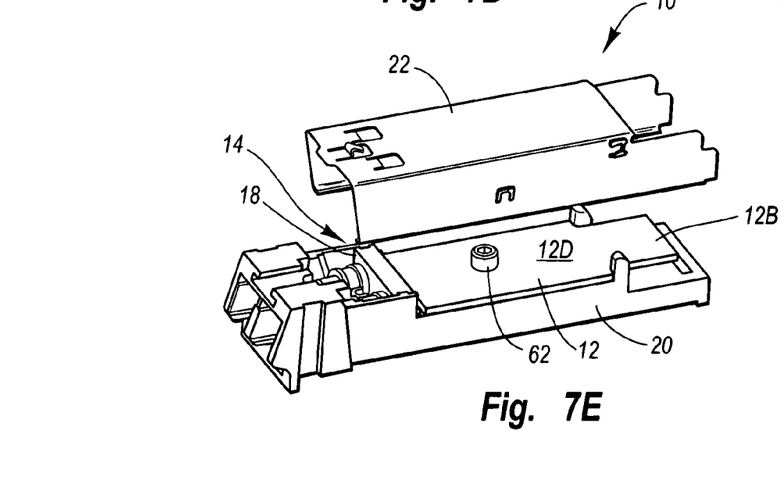
FIG. 7E is a perspective view showing yet another step in the assembly of the optical transceiver.
Figure 8:
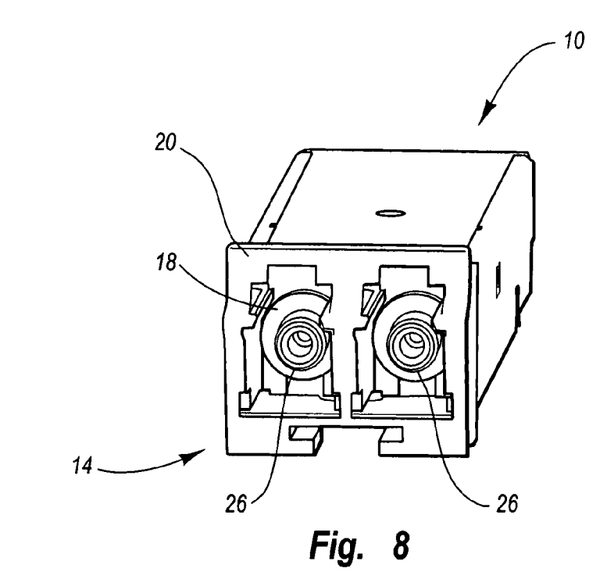
FIG. 8 is a perspective end view of the optical transceiver after assembly thereof.

In FIG. 7E the closure 22, comprising metal, plastic, or other suitable material, is shown being placed on the shell 20 so as to mate therewith, forming a housing for the transceiver 10 after the aforementioned components have been assembled. Preferably, the closure 22 connects with the shell 20 in a snap-fit configuration, further simplifying assembly. Once the closure 22 is in place, it can assist in maintaining the TPCB 12 and the TROSA 14 in place. FIG. 8 shows a perspective view of the transceiver 10 as fully assembled.

In addition to the above features, embodiments of the present connector also enable simplified changeout of some transceiver components. For instance, should it become necessary for the TROSA 14 to be replaced, the closure 22 can be removed, and the TROSA simply pulled from the transceiver 10. This is possible by virtue of the fact that no adhesive, solder, or other fixed bond exists between the conductive pads 40 of the TROSA 14 and the fingers 60 of the connector 16. Rather, only a compressive engagement exists between the pads 40 and the fingers 60. Thus, when the TROSA 14 is pulled from the transceiver, the compressive engagement is released in a simple and straightforward manner. In contrast, known configurations require solder and epoxy coatings to be removed from the electrical connections between the TROSA and the connector before separation can be achieved. In a similar manner, the present configuration also enables the connector 16 and TPCB 12 to be easily removed from the transceiver 10, if desired. This removal occurs by first removing the screw 62, then lifting the TPCB 12 from the transceiver shell 20. Again, the simple compressive engagement between the TROSA conductive pads 40 and the fingers 60 of the connector 16 enables immediate removal of the connector without first breaking any solder or epoxy coatings.

Figure 9:
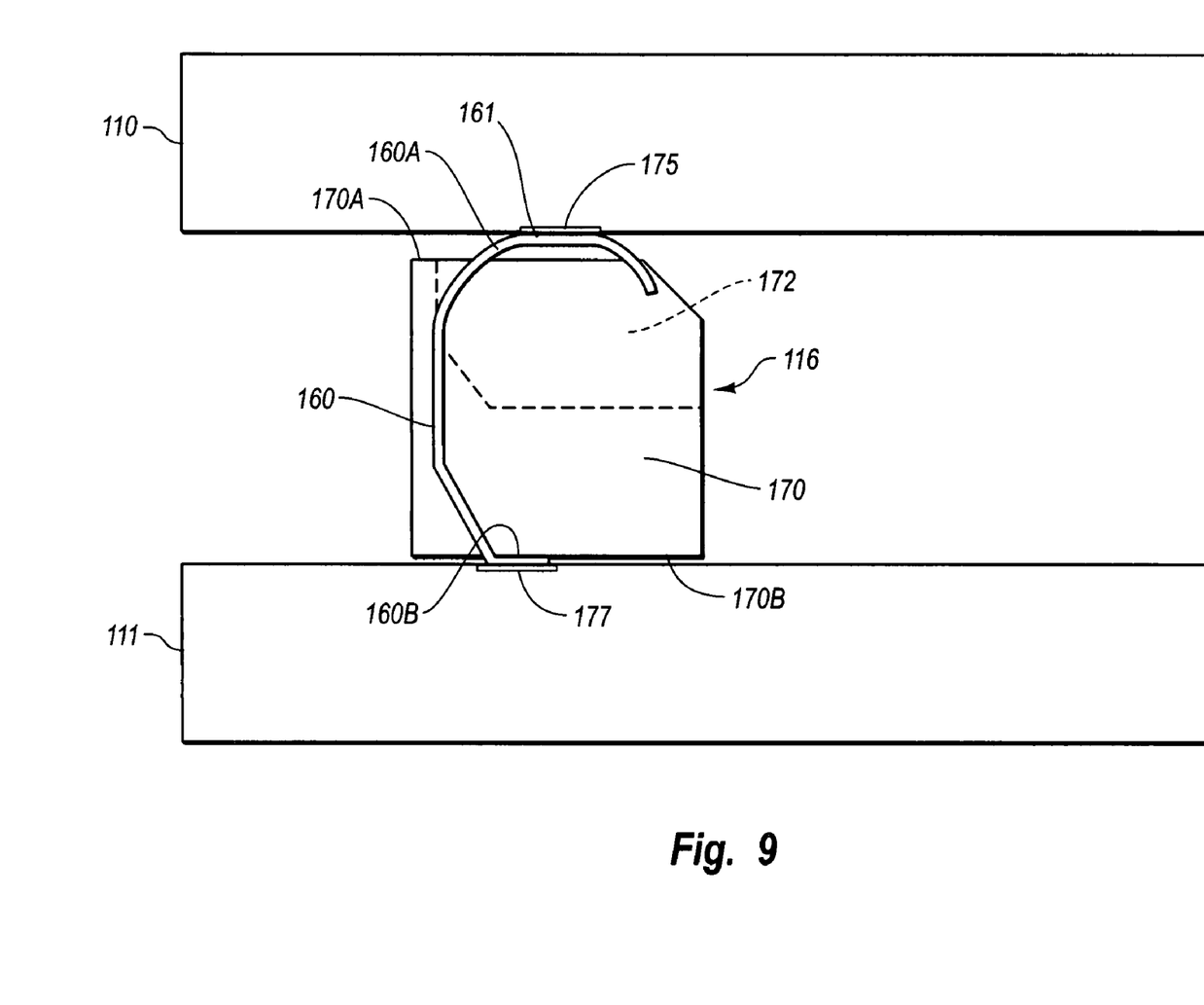
FIG. 9 is a cross sectional side view of first and second printed circuit boards interconnected by an electrical connector, according to another embodiment of the present invention.

Reference is now made to FIG. 9, which depicts an electrical connector according to another embodiment. It is appreciated that embodiments of the connector described herein can be utilized in multiple implementations. One such implementation is depicted in FIG. 9, which shows, in cross section, first and second PCBs 110 and 111 positioned in a parallel, spaced-apart configuration with respect to one another. The PCBs 110 and 111 can be located within a transceiver (not shown), for instance, or within another electronic or optoelectronic device. The PCBs 110 and 111 can also form part of separate but adjacent transceivers. A connector 116, configured in accordance with the present embodiment, is shown interposed between the PCB 110 and 111. The connector 116 includes an elongate body 170 and a plurality of slots 172, similar to that of previous embodiments.

A finger 160 is positioned in each of the slots 172 and includes both a first portion 160A and a contact portion 160B. The first arcuate portion 160A of each finger 160 extends from a first face 170A of the body 170 to engage a corresponding contact pad 175 located on the PCB 110. In detail, a flat section 161 is included on the otherwise arcuate first portion 160A for engagement with the respective contact pad 175. Also, the contact portion 160B of each finger 160 is positioned on a second face 170B of the body 170 to engage contact pads 177 located on the PCB 111. The contact portions 160B can be soldered to the contact pads 177, if desired. Alternatively, the contact portions can form pins, as described in other embodiments above. The configuration of FIG. 9 thereby creates a secure electrical interconnection between the PCBs 110 and 111, while also enabling the ready removal of one or both PCBs without undue expense in time or resources. In alternative embodiments, the contact portion 160B can also be formed arcuately, similarly to the arcuate portion 160A, thereby allowing for compressive engagement between both PCBs.

In accordance with the previous discussion, it is appreciated that the connector can be suited to fit one of a variety of different connection implementations. It is thus appreciated that the compressive finger scheme of the connector reliably establishes electrical connectivity between electrical or optoelectronic components while preserving ease of component removal should repair or changeout be needed.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An optical transceiver module, comprising:
   a housing at least partially containing:
   an optical subassembly including one of: an optical transmitter; and an optical receiver;
   a printed circuit board; and
   an electrical connector that electrically connects the optical transmitter and optical receiver of the optical subassembly with the printed circuit board, the electrical connector including:
   a thermoplastic body; and
   a plurality of conductive fingers attached to the body, each finger including:
   a first portion that extends from a first face of the body to engage a corresponding conductive element of the optical subassembly; and
   a second portion positioned on a second face of the body to engage a conductive element of the printed circuit board.

2. The optical transceiver module as defined in claim 1, wherein the body is composed of a thermoplastic having a melting point above reflow temperature of solder used on the printed circuit board.

3. The optical transceiver module as defined in claim 1, wherein the first portion of each finger is arcuately shaped to compressively engage the corresponding conductive element of the optical subassembly when the optical transceiver module is assembled.

4. The optical transceiver module as defined in claim 3, wherein the first portion of each finger is resiliently formed such that the finger is restored to a predetermined shape when the compressive engagement with the optical subassembly is removed.

5. The optical transceiver module as defined in claim 4, wherein the thermoplastic body defines a plurality of slots, each of the fingers being at least partially positioned in a respective one of the plurality of slots, and wherein the fingers and the slots are uniformly sized.

6. The optical transceiver module as defined in claim 1, wherein the optical subassembly includes a substrate upon which the conductive elements respectively engaged by the first portions are disposed.

7. The optical transceiver module as defined in claim 1, wherein the electrical connector is substantially solderlessly connected to the optical transmitter and optical receiver of the optical subassembly.

8. The optical transceiver module as defined in claim 1, wherein the electrical connector is positioned on a single surface of the printed circuit board.

9. The optical transceiver module as defined in claim 1, wherein the printed circuit board includes an edge connector disposed at an edge of the printed circuit board opposite the electrical connector.

10. The optical transceiver module as defined in claim 1, wherein each of the first portions is resiliently compressed as a result of the positioning of the first portion and the corresponding conductive element of the optical subassembly.

11. The optical transceiver module as defined in claim 1, wherein the optical transmitter and optical receiver of the optical subassembly are electrically connected with the printed circuit board solely via the electrical connector.

\* \* \* \* \*